United States Patent
Fish (12)

(10) Patent No.: US 6,548,559 B1
(45) Date of Patent: *Apr. 15, 2003

(54) THERMOPLASTIC COMPOSITIONS AND METHODS

(75) Inventor: Robert Fish, La Habra, CA (US)

(73) Assignee: H. Lee Browne, Greenwich, CT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/807,985

(22) Filed: Mar. 3, 1997

(51) Int. Cl.$^7$ .............................. C08J 11/04; C08L 17/02
(52) U.S. Cl. ..................... 521/41; 521/42.5; 521/44.5; 521/45.5; 521/47; 524/62; 524/71; 523/351
(58) Field of Search .................... 521/41, 42.5, 44.5, 521/45.5, 47; 524/62, 71; 523/351

(56) References Cited

U.S. PATENT DOCUMENTS 4,278,469 A * 7/1981 Yan et al. ..................... 524/71
5,114,648 A * 5/1992 Kus, Sr. ....................... 524/62
5,162,076 A   11/1992 Chiao ........................ 204/534

* cited by examiner

*Primary Examiner*—James J. Seidleck
*Assistant Examiner*—Olga Asinovsky
(74) *Attorney, Agent, or Firm*—Rutan & Tucker, LLP; Robert D. Fish

(57) ABSTRACT

A new composition is formed by combining a reduced waste rubber, a heavy paraffin and a reduced waste thermoplastic, and then further reducing the resulting material while holding it at an elevated temperature. In preferred embodiments the rubber and thermoplastic are pre-processed by reduction to mesh sizes of about 0.25 inch and 0.5 inch respectively, and the paraffin is pre-processed by being fluidizing to have a viscosity of at most about 1.0 Centipoise. It is also contemplated that the rubber and paraffin can be advantageously combined with each other prior to inclusion of the thermoplastic, with the paraffin/rubber combination being heated to a temperature of about 220° F. to about 250° F. for about 3 minutes. It is still further contemplated that the combination of rubber, paraffin and thermoplastic can be heated to between about 360° F. and about 500° F.

10 Claims, 1 Drawing Sheet

THERMOPLASTIC COMPOSITIONS AND METHODS

FIELD OF THE INVENTION

The field of the invention is thermoplastic compositions.

BACKGROUND

Numerous attempts have been made to make useful products from wastes, especially rubber, plastic and paraffin wastes, all of which tend to be extremely resistant to natural degradation. U.S. Pat. No. 4,795,603, for example, teaches combining crushed rubber and plastic wastes to form an ebony-like configuration which is reported to be lightweight, and to have good hardness, water and weather resistance. As another example, Hungarian application T55270 A teaches mixing plastic polyurethane waste with rubber and paraffin oil to produce an injection moldable substance. Neither of these reference, however, teach how to combine use a waste rubber, a waste plastic and a heavy paraffin, which may also be a waste product. This is significant because such waste products may pose significant environmental problems, and are generally more difficult to utilize in manufacturing than virgin materials.

Issued U.S. Pat. No. 5,114,648 ("the '648 patent") patent, which is incorporated by reference herein in its entirely, does teach processes for producing thermoplastic resin products which combines both waste rubber and waste plastic, along with a heavy paraffin. In the processes of the '648 patent, a heated heavy paraffin distillate is pre-heated to a viscosity of approximating 0.70 Centipoise and then spray coated onto an at least partially vulcanized rubber composition. The resulting mixture is then combined with a thermoplastic, and the resulting combination is further reduced (as by mastication), extruded, and then molded or otherwise formed into a final product. The '648 patent further teaches that the process could include granulating the vulcanized rubber to a predetermined mesh size, pre-processing contaminant removal, and could advantageously employ various processing parameters including use of a solvent having a boiling point of about 500° F.–1000° F. and a vapor density of about 8.0–13.0 Lbs/Cu.ft., pre-heating the paraffin distillate to about 180° F., heating the rubber/distillate composition to about 220° F.–250° F. for a period of about 3.0 minutes.

At the time of filing the application which issued into the '648 patent, it was thought that the processes claimed in that patent required the recited limitations. Those limitations, however, may have unnecessarily limited the usefulness of the claimed processes. Thus, there is a need to improve upon the claimed processes by eliminating various recited limitations.

SUMMARY OF INVENTION

The present invention is directed towards products and processes in which a reduced rubber composition is combined with a heavy paraffin and a reduced thermoplastic, wherein one or both of the rubber and thermoplastic are derived at least partially from waste products, and the resulting rubber/paraffin/thermoplastic material is further reduced while at an elevated temperature. In preferred embodiments the rubber is pre-processed by reduction to mesh sizes of about 0.25 inch and 0.5 inch respectively, and the heavy paraffin is pre-processed by being fluidizing to have a viscosity of at most about 1.0 Centipoise. It is also contemplated that the rubber and paraffin can be advantageously combined with each other prior to inclusion of the thermoplastic, with the paraffin/rubber combination being heated to a temperature of about 220° F. to about 250° F. for about 3 minutes. It is still further contemplated that the combination of rubber, paraffin and thermoplastic can be heated to between about 360° F. and about 500° F.

DETAILED DESCRIPTION

Figure 1:
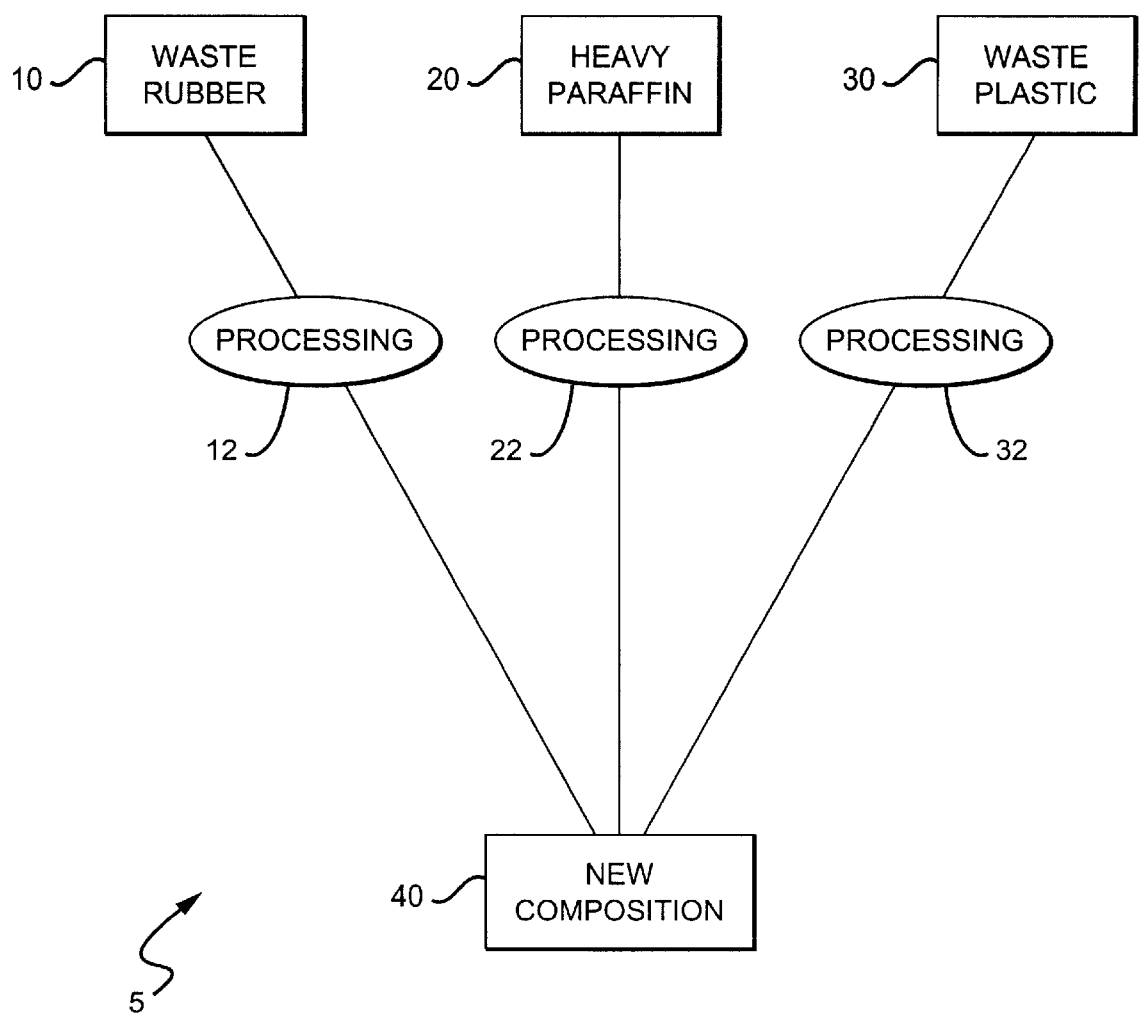
FIG. 1 is a block diagram of a generalized process and composition according to the present invention.

FIG. 1 generally depicts a processing system 5 in which a rubber 10 is combined with a paraffin 20 and a thermoplastic 30 to form a new composition 40. As discussed further below, each of the three ingredients 10, 20 and 30 may optionally undergo one or more pre-processing steps 12, 22 and 32 respectively, and the new composition 40 may itself undergo one or more processing step(s).

Considering FIG. 1 in greater detail, the rubber 10 is preferably provided as scrap material, which may include some combination of whole, shredded, pulverized, pelletized or otherwise reduced vehicular tires, and/or other rubber or rubber containing products. Rubber 10 may, but need not be, at least partially vulcanized.

Depending primarily on the size and purity of the rubber provided, one may employ optional step(s) 12 to prepare the rubber for further processing. For example, if the rubber 10 is provided as substantially unreduced tires, the rubber may be prepared for inclusion in mixture 40 by being reduced. Such reduction can employ mechanical, chemical or other means, but preferably such reduction would take place by mechanical means such as grinding and pulverizing. Where mechanical means are used for the reduction, it is particularly preferred to produce thereby particles having mesh sizes of about 0.25 inches or less. Of course if the rubber is provided in pre-reduced form, as in commercially available rubber "crumb", additional reduction may not be necessary. In another aspect of optional step(s) 12, a magnetic field may be employed to remove impurities that are responsive to magnetic fields. Similarly, other impurities may be removed chemically, centrifugally, by flotation, or by other means. The containers and conditions in which each of optional step(s) 12 takes place include those previously known in the art, and especially those previously disclosed in the '648 patent.

The paraffin 20 is contemplated to be a heavy paraffinic distillate such as that set forth in the '648 patent. A preferred paraffin is TYRSOLVT™ manufactured and produced by Tyrplex Corporation of Kelton, Pa. TYRSOLVT™ is a highly aromatic composition having a specific gravity approximating 1.0, and an evaporation rate approximately 10 times slower than ethyl ether. Other heavy paraffins may be provided as industrial waste. As used herein, the term heavy paraffin refers to a paraffin which is not liquid at room temperature, and which has a boiling point between about 500° F. and about 1000° F.

Optional pre-processing step(s) 22 for the paraffin 20 preferably include fluidizing the paraffin 20 to a workable viscosity. The term "workable viscosity" may advantageously be about 1.0 Centipoise or less, depending on the requirements of other steps. For example, where a later step includes spray depositing the paraffin 20 onto the rubber 10, then a viscosity of about 0.7 Centipoise or less is desired. Where the paraffin 20 is mechanically mixed with the rubber 10 as in a mixing vat, a higher viscosity of about 1.0 or more Centipoise or may be sufficient. Step(s) 22 may also include a heating step, preferably to at least about 150° F., and preferably about 180° F., which is contemplated to be performed in any appropriate manner including microwave or electrical resistance heating. Step(s) 22 may also include addition of fly ash to aid in devulcanization (where appropriate), and provide an inexpensive extender.

The thermoplastic 30 includes any available thermoplastic material, or combination of thermoplastic materials, in which the thermoplastic component comprises at least about 70% by weight. As used herein, the term "thermoplastic" means any plastic which is capable of softening or fusing when heated, and of hardening again when cooled. Particularly preferred thermoplastics generally comprise compounds in the polyolefin class, including polymers and copolymers taken from the group consisting of polyethylene, polypropylene, polybutenes, and polyisoprenes and combinations thereof The thermoplastic 30 is most preferably taken from a waste stream, or is otherwise provided as a waste product such as used plastic containers.

Optional thermoplastic processing step(s) 32 preferably reduce the thermoplastic 30 to a flowable particle size, and remove impurities. As discussed above, the reduction may take place mechanically, chemically and so forth, and the removal of impurities may take lace, magnetically or by other means. The preferred particle size for the thermoplastic is a mesh size of about 0.5 inch or less.

Mixture 40 can be produced either in multiple vats or in a single vat, and in either a continuous process or in a batch process. In a preferred process, the rubber 10 processed through optional step(s) 12 is combined with paraffin 20 processed through optional step(s) 22 such that the paraffin component comprises about 3.0%–10.0% of the weight of the paraffin/rubber mixture. Mixing preferably takes place by spraying the paraffin 20 onto the rubber 10. The paraffin/rubber combination is preferably heated to a temperature of about 220° F. to about 250° F. for about 3 minutes. It is contemplated that the flow rate would preferably fall within the approximating range of about 4,000–6,500 Lbs/Hr. In experiments with this preferred procedure, it has been found that the paraffin/rubber mixture becomes highly viscous and gummy in nature, and it has been observed that a blackened color appears on the surface of the mixture indicating at least partial devulcanization.

In a preferred process, the heated paraffin/rubber mixture is then mechanically combined with the thermoplastic 30 such that the paraffin/rubber mixture represents at least about 20% by weight of the paraffin/rubber/thermoplastic mixture, and most preferably about 30% by weight of the paraffin/rubber/thermoplastic mixture, and the paraffin/rubber/thermoplastic mixture is preferably heated to an elevated temperature while being further reduced by grinding, crushing, or some other means. The term "elevated temperature" is used herein to mean a temperature at which the rubber and thermoplastic components are sufficiently fluid to become thoroughly mixed with the paraffin and with each other, which temperature is presently considered to range from about 360° F. and about 500° F. The mixing and reduction preferably occur in a double arm masticator (not shown) that continuously feeds directly into screw feed (not shown) for pelletizing, extruding profiles or calendering. Assuming a throughput of about 6500 LBS per hour of paraffin/rubber/thermoplastic mixture, it is contemplated that the residence time within the masticator would be approximating 10–15 seconds.

In a preferred process, the heated paraffin/rubber/thermoplastic mixture passes through a discharge screw feed (not shown), and thence through one or more dies (not shown) for pelletization, or formation into other shapes. Material passing through the dies is then cooled or further processed as in injection molding, extrusion, compression molding, calendaring and possibly blow molding.

In alternative processes, the particular sequences just described need not be followed. For example, it may be desirable to combine rubber 10, paraffin 20 and thermoplastic 30 together all at the same time rather than in stages, or to combine the rubber 10 and the thermoplastic 30 together prior to addition of the paraffin 20. Additionally, the fly ash mentioned above and/or other components may be added to improve characteristics of the final product.

There are numerous advantages to the below claimed subject matters over that previously known. For example, it now recognized that the processes described herein can be successfully employed with rubber compositions which are vulcanized, partially vulcanized, or non-vulcanized. Also, it is now recognized that the paraffin need not necessarily be combined with the rubber through spray coating, and therefore the paraffin need not necessarily be limited to any particular viscosity. Still further, the process steps do not require combining of the rubber and paraffin prior to inclusion of the thermoplastic, and the rubber/paraffin/thermoplastic mixture can be mixed through methods other than mechanical mastication.

Thus, numerous thermoplastic compositions and methods have been disclosed. While specific embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A process for producing a composition comprising the steps of:

providing a reduced rubber containing product, a paraffin and a reduced thermoplastic, at least one of the rubber containing product and the thermoplastic derived from a waste product;

combining the reduced rubber containing product, paraffin and reduced thermoplastic to produce a rubber/paraffin/thermoplastic combination, said combination taking place without previously forming and heating an intermediate from the rubber containing product and paraffin; and reducing the rubber/paraffin/thermoplastic combination while the combination is at an elevated temperature of between about 360° F. and about 500° F.

2. The process of claim 1 further comprising reducing the rubber to an average mesh size of about 0.25 inches or less prior to being combined with at least one of the paraffin and the thermoplastic.

3. The process of claim 1 further comprising providing the paraffin as a composition having a boiling point between about 500° F. and about 1000° F.

4. The process of claim 1 further comprising fluidizing the paraffin to at most about 1.0 Centipoise.

5. The process of claim 1 further comprising reducing the thermoplastic to an average mesh size of about 0.5 inches or less prior to being combined with at least one of the paraffin and the rubber.

6. The process of claim 1 wherein the step of combining includes heating the paraffin and spraying the heated paraffin onto the rubber.

7. The process of claim 1 further comprising combining the paraffin with the rubber, and heating the paraffin/rubber combination to a temperature of about 220° F. to about 250° F. for about 3 minutes.

8. The process of claim 1 further comprising masticating the rubber/paraffin/thermoplastic composition while heating it to between about 360° F. and about 500° F.

9. The process of claim 1 further comprising pre-processing the rubber and thermoplastic by reduction to mesh sizes of about 0.25 inch and 0.5 inch respectively.

10. The process of claim 1 further comprising heating the paraffin/rubber/thermoplastic combination to a temperature of at least about 360° F.

* * * * *